United States Patent [19]

Hendrix

[11] 3,830,040

[45] Aug. 20, 1974

[54] VAPOR RECOVERY SYSTEM
[75] Inventor: Lloyd T. Hendrix, Santa Ana, Calif.
[73] Assignee: Vaporex, Anaheim, Calif.
[22] Filed: Feb. 25, 1972
[21] Appl. No.: 229,306

[52] U.S. Cl. ............................. 55/32, 55/88, 62/54
[51] Int. Cl. ..................... B01d 53/14, F17c 13/00
[58] Field of Search .............. 55/32, 33, 84, 88, 93, 55/94, 223, 269, 48, 51; 62/17, 50, 51, 54; 220/85 VR, 85 VS

[56] References Cited
UNITED STATES PATENTS

| | | | |
|---|---|---|---|
| 2,765,872 | 10/1956 | Hartman et al. | 55/88 |
| 3,213,593 | 10/1965 | Hendrix | 55/32 |
| 3,622,504 | 11/1971 | Strum | 55/88 |
| 3,648,436 | 3/1972 | Schonewald et al. | 55/88 |
| 3,714,790 | 2/1973 | Battey | 62/54 |

Primary Examiner—Charles N. Hart
Attorney, Agent, or Firm—Boniard I. Brown

[57] ABSTRACT

The vapor of a volatile liquid entrained in a gas is recovered by providing an insulated relatively large volume body of the liquid, continuously recirculating liquid from the body along a closed flow path through a refrigeration zone and a following primary condensation zone back to the body, and introducing the gas into the condensation zone for direct contact with the recirculating refrigerated liquid within the zone after presaturation of the gas by the liquid from the body, stripping of the free liquid from the presaturated gas and compression of the gas, whereby the entrained vapor is condensed and admixes with the recirculating liquid. Freezing of any water vapor condensed from the gas is prevented by introducing into the gas prior to its contact with the refrigerated liquid a vaporized freezing point depressant which condenses with the water vapor to provide an anti-freeze and is then recovered by fractionation and recycled back to the incoming gas to be processed to repeat the cycle. The primary application of the invention involves processing the hydrocarbon vapor-laden air expelled from a transport tanker for a volatile hydrocarbon liquid, such as gasoline to prevent atmospheric pollution and reclaim the hydrocarbon content of the air. In this application, hydrocarbon liquid from the primary condensation zone is subjected to fractionation to recover a heavy hydrocarbon liquid fraction which is recycled through a secondary condensation zone in direct contact with the air from the primary condensation zone and in indirect contact with the cold primary liquid to effect condensation of any remaining hydrocarbon vapor in the air and a light hydrocarbon fraction which is recycled back to the incoming vapor-laden air to be processed. The vapor recovery apparatus is preferably mounted on skids or other ground support means to permit its fabrication in a factory and subsequent transportation to a point of use.

18 Claims, 2 Drawing Figures

3,830,040

VAPOR RECOVERY SYSTEM

RELATED APPLICATIONS

Reference is made to my related co-pending application Ser. No. 427,452, filed Dec. 26, 1973 which, in turn, is a continuation of application Ser. No. 262,089, filed June 12, 1972, entitled "Method and System For Handling Volatile Liquid Vapors."

BACKGROUND OF THE INVENTION

1. Field of the Invention

This invention relates generally to the field of gas handling and processing and more particularly to a novel method of and apparatus for recovering a vapor from a gas.

2. Discussion of the Prior Art

As will appear from the ensuing description, the vapor recovery method and apparatus of the invention are capable of various applications. The primary application involves processing the hydrocarbon vapor-laden air expelled from a transport tanker for a volatile hydrocarbon liquid, such as gasoline, during refilling of the tanker for the dual purpose of preventing atmospheric pollution and reclaiming the hydrocarbon content of the air.

Gasoline and other volatile hydrocarbon liquids are commonly transported in large tankers, such as railroad tank cars, tank trucks, barges, ocean-going tankers, and the like. The use of such tankers presents the problem that during refilling of a tanker, the entering hydrocarbon liquid displaces or expels hydrocarbon vapor-laden air from the tanker. Expulsion of such vapor into the atmosphere is detrimental for two reasons. First, the vapor pollutes the atmosphere in violation of the ever-increasing number of laws in the air of air pollution. Secondly, the vapor represents a significant loss of the hydrocarbon liquid being handled. Accordingly, recovery of the hydrocarbon vapor from the expelled air prior to discharge of the air to the atmosphere is essential if not mandatory.

A variety of vapor recovery systems have been devised for the above and other similar purposes. Examples of such systems are found in U.S. Pat. Nos. 3,213,593 and 3,369,371. However, the existing vapor recovery systems, particularly those for recovering the gasoline vapor expelled from a gasoline tanker during refilling, have certain disadvantages which this invention overcomes.

By way of example, one disadvantage of the existing gasoline vapor recovery systems resides in the fact that they are designed for intermittent operation only; that is, these systems remain in full operating condition only during actual vapor recovery periods and hence must be started and stopped each time a tanker is refilled. This mode of operation requires the constant presence of a highly trained operator or substantial time consuming training of the tanker operators such that they may operate the systems properly. Also, such start and stop operation creates costly time delays.

Another disadvantage of the existing gasoline vapor recovery systems results from the fact that gasoline tankers are periodically steam cleaned. As a consequence, the air expelled from a tanker during refilling often contains a substantial quantity of water vapor in addition to gasoline vapor. This water vapor condenses and freezes, forming ice in the existing recovery systems, thereby requiring the existing systems to be periodically shut down and de-iced. These periodic de-icing operations introduce further costly time delays.

Other disadvantages of the existing recovery systems are their relatively large space requirement resulting from their use of large above ground holding tanks, their requirement of fabrication at their point of use, and their requirement of high gas compression pressures resulting in complex and costly equipment.

SUMMARY OF THE INVENTION

The present vapor recovery system has a vapor condensing loop including a relatively large thermally insulated holding tank for containing a body of the liquid whose composition is substantially that of the vapor to be recovered, and means for continuously recirculating liquid from the tank along a closed flow path through a refrigeration zone and a following primary condensation zone back to the tank. The liquid is refrigerated during its passage through the refrigeration zone and then passes through the condensation zone back to the holding tank. The gas to be processed is presaturated with liquid from the holding tank, then stripped of free liquid, compressed and cooled, and finally introduced into the liquid flow path at the inlet to the conensation zone for flow of the gas and refrigerated recirculating liquid through the zone in direct heat transfer contact with one another. Within the condensation zone is a contactor which maximizes the surface area contact between the liquid and gas. The vapor in the gas is thereby condensed by direct heat transfer to the liquid and the resulting liquid condensate admixes with and returns to the holding tank with the recirculating refrigerated liquid.

The gas emerging from the primary condensation zone may pass through a following secondary condensation zone in direct heat transfer contact with refrigerated liquid which is recirculated through the secondary zone and in heat transfer relation to refrigerated liquid from the primary condensation zone to effect condensation of any remaining vapor in the gas. The gas emerging from the secondary zone is then stripped of free liquid which is recycled through the secondary zone and the vapor free gas is vented to a suitable receiver, such as atmosphere.

According to a feature of the invention, the holding tank of the vapor recovery system is sized and thermally insulated to contain a large body of refrigerated liquid (gasoline). This large refrigerated liquid body provides a cold reservoir or thermodynamic surge "fly wheel" which achieves three unique and important benefits, namely, (1) reduces refrigeration unit size required for proper handling of a wide range of refrigeration demands due to variations in thermal loading rate and vapor composition, (2) continued operation of the vapor recovery system for an extended period of time without additional refrigeration in the event of failure of the system refrigeration equipment, and (3) reduction of the system compression pressure. In the particular inventive embodiment illustrated, the holding tank 18 is buried in and thermally insulated by the surrounding ground. The primary liquid stores refrigeration during low demand periods by a lower temperature occurring during its continued circulation through the refrigeration unit.

According to another feature of the invention, an atomized freezing point depressant such as methanol, is injected into the incoming gas to be processed prior to contact of the gas with cold liquid in the system. This depressant is initially vaporized by the incoming gas and then condenses to provide an anti-freeze upon contact with refrigerated liquid in the system. The anti-freeze action of the depressant inhibits the freezing of any water vapor which condenses from the gas and thereby eliminates the necessity of periodically shutting down the vapor recovery system to de-ice the system. The depressant is then recovered by fractionation and recycled back to the incoming gas stream.

As noted earlier, the primary application of the vapor recovery system involves recovering the gasoline vapors present in the air expelled from a gasoline tanker during refilling of the tanker. In this application, an air vent on the tanker is connected to the gas inlet of the recovery system by a hose or the like, such that the vapor-laden air expelled from the tanker during refilling enters the system. The recovery system includes means for subjecting liquid gasoline in the system to fractionation to recover heavy and light hydrocarbon fractions. The heavy fractions are recycled through the secondary condensation zone to effect removal of any vapor remaining in the gas, i.e., air, passing through the zone prior to exhausting of the air to atmosphere. If necessary, the exhausting air may pass through a reactor or the like for removing any remaining traces of vapor.

Preferably, the present recovery system is fabricated at the factory and transported to its point of use. To facilitate this transportation, the system is constructed in a number of separate sections which are mounted on skids or the like for ease of transportation and interconnected into a unitary operative system at the point of use.

DESCRIPTION OF THE PREFERRED EMBODIMENT

Figure 1A:
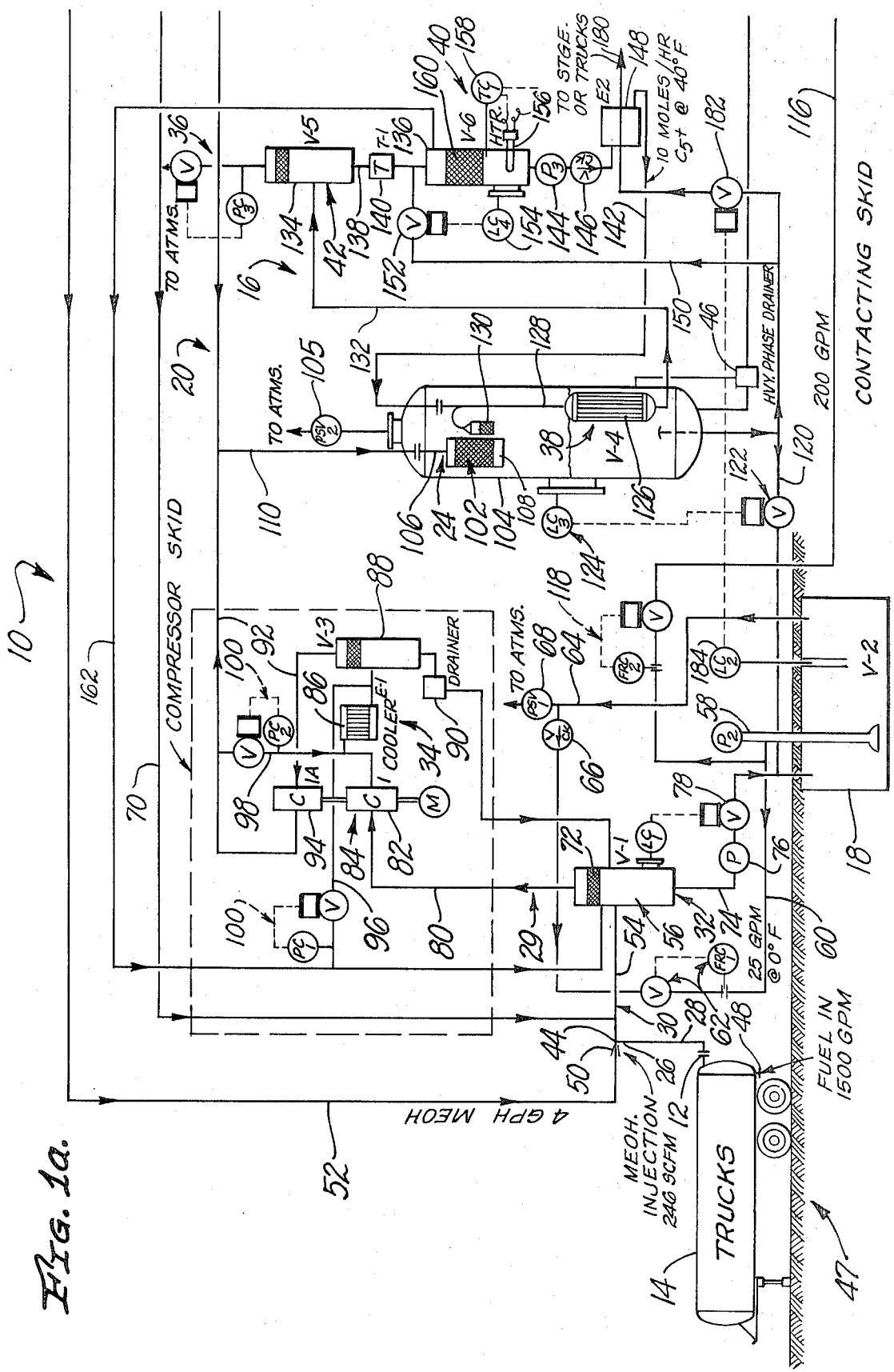
FIGS. 1A and 1B diagrammatically illustrate a gasoline vapor recovery system according to the invention.
Figure 1B:
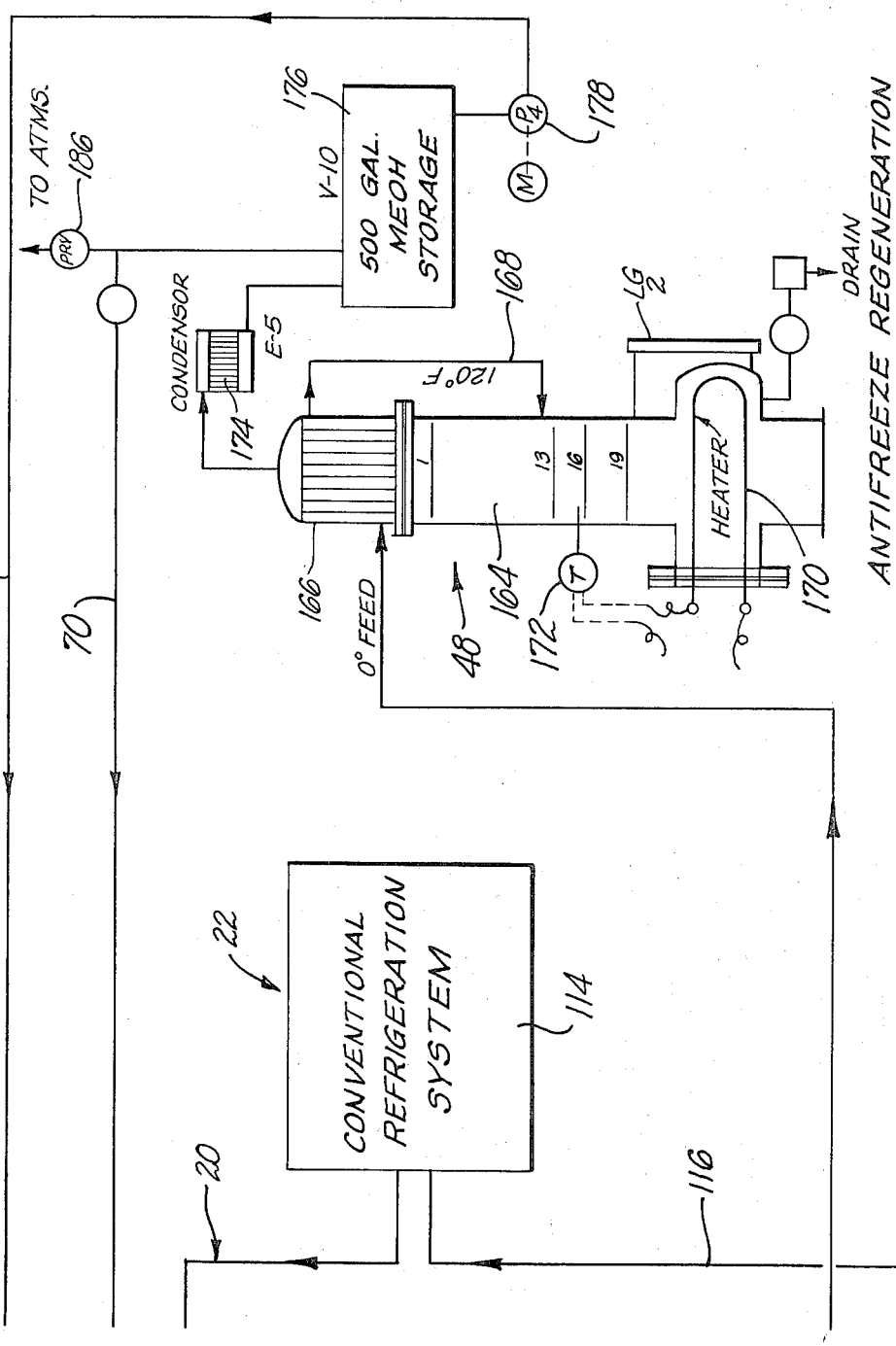

The illustrated vapor recovery system 10 is designed to recover the vapor (gasoline vapor) present in the gas (air) expelled through the vent 12 of a gasoline tanker 14 during refilling of the tanker. In general terms, the recovery system has a vapor condensing circuit 16 including a holding tank 18 for containing a body of the liquid (gasoline) whose vapor is to be recovered from the gas to be processed, and a flow path 20 along which liquid from the tank is continuously recirculated through a refrigerant zone 22 and a following primary condensing zone 24 back to the holding tank. The liquid is refrigerated as it passes through the refrigerant zone and then passes through the condensing zone back to the holding tank.

The gas to be processed enters the vapor recovery system 10 through an inlet 26. In the particular embodiment illustrated, this inlet is connected to the vent 12 of the gasoline tanker 14 by a hose 28 through which the gasoline vapor-laden air expelled from the tanker during refilling of the tanker flows to the recovery system. The hose may have suitable quick disconnect couplings to facilitate its connection between the tanker and recovery system by the tanker operator. The incoming gas to be processed passes along an inlet flow path 29 containing a presaturation zone 30, a scrubbing zone 32, and a compression zone 34 to the refrigerated liquid circuit 16. During its flow from the inlet 26 to the liquid circuit 16, the gas is presaturated with liquid from the holding tank 18 within the presaturation zone 30, then stripped of free liquid within the scrubbing zone 32, and finally compressed, cooled, and again stripped of free liquid within the compression zone 34. The compressed gas from the compression zone is introduced into the liquid circuit 16 at the inlet of the condensing zone 24 for flow through the latter zone in direct heat transfer contact with the refrigerated liquid flowing through the condensing zone. The liquid vapor in the gas is thereby condensed by direct heat transfer to the recirculating refrigerated liquid, and the liquid condensate mixes with the recirculating liquid and returns with the latter to the holding tank 18.

In some cases the gas emerging from the condensing zone 24 may be sufficiently free of vapor to eliminate the need for further processing of the gas. Should this be so, the gas may be vented directly to a receiver, such as atmosphere, through a vent system 36. The particular gasoline vapor recovery system 10 illustrated, however, has a secondary condensing zone 38 through which gas from the primary condensing zone 24 passes in direct heat transfer contact with refrigerated liquid from a fractionating zone 40. This liquid from the fractionation zone is a heavy hydrocarbon fraction consisting of "heavy ends," such as pentanes plus, produced by fractionation of liquid from the condensing zones 24, 38. Vapor remaining in the gas from the primary condensing zone 24 is condensed within the secondary condensing zone 38 by direct heat transfer to the refrigerated "heavy ends" passing through the secondary zone. The efflux from the secondary zone passes to a scrubbing zone 42 where free liquid is removed from the gas. The gas (vapor-free air) is then vented to atmosphere through the system vent 36 and the separated free liquid is returned to the fractionation zone 40 to repeat the cycle.

The fractionation process within the fractionating zone 40 also produces a light hydrocarbon fraction consisting of "light ends," such as butane. This light fraction is recycled back to the presaturation zone 30 to mix with and aid in presaturation of the incoming gas.

In some cases, the gas to be processed may contain water vapor. Gasoline tankers, for example, are frequently steam cleaned with the result that water vapor is entrained in the gasoline vapor-laden air expelled from the tanker during refilling, particularly immediately following cleaning. Such water vapor will condense with the gasoline vapor and will tend to freeze. In this regard, it will be recalled from the earlier discussion that the existing vapor recovery systems must be periodically shut down and de-iced by heating.

According to a feature of the present invention, the necessity of such periodic de-icing is eliminated by injecting into the strain of incoming gas to be processed, within an injection zone 44 preceding the gas presaturation zone 30, an atomized freezing point depressant, such as methanol. This depressant is vaporized by and mixes with the incoming gas prior to contact of the gas with the cold liquid in the presaturation zone. During the ensuing flow of the gas through the recovery system, the depressant condenses with water vapor in the gas to provide an anti-freeze which inhibits freezing of the condensed water.

The freezing point depressant is recovered by recirculating liquid from the condensing zone 24 through a heavy phase drawer 46 and a depressant recovery zone 48. The liquid entering this zone is subjected to a fractionation process which yields a depressant vapor and liquid water. The depressant vapor is condensed and recycled back to the depressant injection zone 44. The recovered water is drained from the system.

Referring now in greater detail to the particular gasoline vapor recovery system illustrated, the gas inlet 26 of the system is located at a loading "rack" 47 at which the gasoline tankers 14 are parked during refilling. The tankers are filled through a bottom inlet 48. The rising liquid level in tankers displaces gasoline vapor-laden air through the upper tanker vent 12 into the recovery system through its inlet 26. Just beyond this inlet is a freezing point depressant injection nozzle 50 which is connected by a line 52 to the depressant recovery zone 48. As will be explained presently, liquid depressant is pumped through the line 52 to the nozzle 50 which then sprays the depressant into the stream of incoming air to be processed. The depressant is vaporized by the incoming air and flows with the air through a mixer 54 at the gas presaturation zone 30 to a scrubber 56 at the scrubbing zone 32.

The gasoline holding tank 18 contains a pump 58 for pumping refrigerated gasoline from the tank through a line 60 to the mixer 54. Gasoline flow rate through the line is regulated by a flow control valve 62. Vapor from the holding tank is vented to the mixer through a line 64 containing a check valve 66 and a pressure relief valve 68. The light ends recovered by liquid fractionation in the fractionation zone 40 flow to the mixer through a line 70. The mixer 54 contains nozzles or other means for injecting into the air passing through the mixer the liquid gasoline and gasoline vapor from the holding tank 18 and the light gasoline ends from the fractionation zone 40. The air is thereby presaturated with gasoline. It is significant to note here that the freezing point depressant is injected into the incoming air upstream of the mixer 54 and condenses with any water vapor in the air upon contact with the cold liquid and vapor in the mixer to prevent freezing of the water condensate.

Scrubber 56 may be any conventional device for separating free liquid from the gas entering the scrubber. The illustrated scrubber has a porous barrier 72 of york mesh or the like for separating the air and free liquid. The free liquid collects in the bottom of the scrubber and is returned to the holding tank 18 through a return line 74 by a pump 76. Flow through the return line is regulated by a float controlled valve 78 to maintain a preselected liquid level in the scrubber.

The liquid free air from the scrubber 56 passes through a line 80 to the first stage 82 of a motor driven compressor 84 at the compression zone 34. Compressed air from the compressor passes through a cooler 86 which removes the heat of compression from the air to a scrubber 88. Scrubber 88, like scrubber 56, removes free liquid from the compressed air. This free liquid is drained from the bottom of the scrubber 88 to the bottom of the scrubber 56 through a drainer 90 which permits the passage of liquid but blocks the passage of air and vapor. The compressed liquid free air from the scrubber 88 passes through a line 92 containing the second stage 94 of the compressor 84 to the primary condensing zone 24.

As noted earlier, one important and advantageous feature of the invention resides in the fact that the present vapor recovery system is designed to operate continuously in such a way that refilling of a tanker 14 at the loading rack 47 requires only connection of the vent hose 28 to the tanker vent 12 and connection of the gasoline filler hose to the tanker inlet 48. To this end, the illustrated vapor recovery system is provided with two compressed air recirculating lines 96 and 98 for maintaining sufficient air flow through the compressor stages 82, 94 to maintain proper compressor suction. Line 96 connects the outlet of the first compressor stage cooler 86 to the liquid side of the inlet scrubber 56. Line 98 connects the outlet of the second compressor stage 94 to the cooler inlet. Each recirculating line 96, 98 contains a flow regulating valve 100 for regulating compressed air flow through the respective line in such a way as to maintain the proper compression suction under all operating or loading conditions.

The primary condensing zone 24 has a liquid vapor contactor 102 within a closed condensor tank 104 having an upper pressure relief vent valve 105 to atmosphere. This contactor is conventional and hence need not be described in elaborate detail. Suffice it to say that the contactor has a container with an upper inlet 106 and a lower outlet 108. Within the contactor is packing material, such as that marketed by the U. S. Stoneware Co. under the trade name INTALOX, which provides a large surface area for liquid flow. The contactor inlet 106 connects through a line 110 to the compressed air line 92 from the compressor 84 and to a liquid recirculating line 112 which is connected to the outlet of a refrigeration unit 114 at the refrigeration zone 22. The inlet of the refrigeration unit 114 is connected to the discharge line 60 of the holding tank pump 58 through a liquid recirculating line 116 containing a flow regulating valve 118. The lower end of the condenser tank 104 is connected to the holding tank 18 through a drain line 120 containing a flow control valve 122. Valve 119a has a liquid level sensor 124 for sensing the liquid level in the lower end of the condenser tank 104 and regulating the valve in response to the liquid level to maintain a relatively constant liquid level. Lines 110, 112, 116, 119, holding tank 18, condenser tank 104, and refrigeration unit 114 together constitute the liquid flow path 20 of the vapor condensing circuit 16.

It will now be understood that during operation of the vapor recovery system 10, compressed liquid free but gasoline vapor-laden air from the compressor 84 and refrigerated liquid gasoline from the refrigeration unit 114 flow in direct heat transfer contact with one another through the contactor inlet line 110 and contactor 102 into the condenser tank 104. During its flow through the contactor, the liquid gasoline flows over the large surface area of the packing in the contactor to provide maximum surface area heat transfer contact between the liquid and air. The gasoline vapor entrained in the air is thereby condensed by direct heat transfer to the cold liquid.

The secondary condensing zone 38 has a heat exchanger 126 below the liquid level in the condenser tank 104. Heat exchanger 126 has an upper inlet connected through a line 128 to a demister or scrubber 130 above the liquid level through which air from the primary condensing zone 102 flows to the heat exchanger. The heat exchanger has an outlet connected through a line 132 to a scrubber 134 at the scrubbing zone 42. Extending from the lower end of the scrubber to the upper end of a fractionating column 136 at the fractionation zone 40 is a line 138 containing a liquid drainer 140 through which liquid flows from the scrubber to the column. The lower end of the fractionating column 136 is connected to the inlet line 128 of the heat exchanger 126 through a line 142 containing a pump 144, check valve 146 and heat exchanger 148. As will be explained presently, liquid gasoline is subjected to fractionation within the column. The resulting condensed vapor admixes with the recirculating liquid gasoline and collects with the latter in the lower end of the condenser tank 104. The combined liquid gasoline then drains from condenser tank to the holding tank 18 for recycling through the liquid flow path 20.

As noted earlier, at least a major portion of the vapor content of the air being processed is removed during flow through the primary condensing zone 24, i.e., through contactor 102. In some applications of the vapor recovery system, the vapor content of the air emerging from the primary condensing zone may be sufficiently low to permit discharge of the air to atmosphere. The particular gasoline vapor recovery system illustrated, however, has a secondary vapor condensing zone 38 within the condenser tank 104 through which the air from the primary zone passes prior to its discharge to atmosphere through the system vent 36.

The liquid gasoline which is separated from the air within the scrubber 134 passes through the liquid drainer 140 to the fractionating column 136. Additional liquid gasoline is fed to the column through a line 150 connecting to condenser tank drain line 120 and containing a flow control valve 152 controlled by a liquid level sensor 154 for the column. Sensor 154 controls the valve 152 to maintain a constant liquid level in the column. Within the lower liquid space of the fractionating column 136 is a heater 156 controlled by a thermostat 158 responsive to the temperature in the column. In the upper end of the column is a packed bed 160 composed of packing like that described earlier. Heater 156 boils the lighter gasoline ends from the liquid gasoline within the bottom of the fractionating column. The resulting gasoline vapors rise to and enter the packed bed 160 which allows equilibrium to occur and effects further fractionation, the light ends rising to the top of the fractionating column and the heavy ends falling to the bottom of the column. The thermostat 158 is set to control the composition of the light and heavy ends. The heavy ends, i.e., pentanes plus, are pumped from the bottom of the column to the secondary condenser heat exchanger 126 to recover more gasoline vapor (light ends), as explained earlier. The lighter gasoline ends, i.e., butane, pass from the upper end of the fractionating column 136 through a line 162 to the inlet scrubber 56 to aid in maintaining the suction of compressor 84. The heavy gasoline ends which are boiled off and recycled through the system are replaced by gasoline supplied to the column through line 150.

As noted earlier, a freezing point depressant is injected through nozzle 44 into the incoming stream of gasoline vapor-laden air to be processed. This depressant condenses with any water vapor in the air to provide an anti-freeze which prevents freezing of the water and thereby eliminates the need for periodic de-icing of the vapor recovery system. The preferred depressant is methanol. However, other depressants, such as ethanol or isopropanol may be used. It will also be recalled that the depressant is continuously recovered within the depressant recovery zone 48 and then recycled back to the depressant injection nozzle 44. To this end, the recovery zone 48 contains a conventional fractionating column 164 having an upper heat exchanger 166. Heat exchanger 166 has an inlet connected to the lower end of the condenser tank 104 through the heavy phase drainer 46. During the residence time of the liquid (gasoline, condensed water, if any, and freezing point depressant) in the lower end of the tank 104, the water and depressant tend to settle to the bottom of the tank. The heavy phase drainer 46 passes the heavy water and depressant but blocks the passage of lighter gasoline ends such as butane.

The water-depressant mixture from the heavy phase drainer 46 passes through the heat exchanger 166 of the depressant recovery fractionator 164 and is heated therein by the vapors rising through the column. The mixture is then directed through a line 168 to the lower end of the column wherein the mixture is heated by a heater 170 controlled by a thermostat 172. Thermostat 172 senses the temperature in the fractionating column 164 and controls the heater 170 to effect vaporizing of the depressant only. The resulting depressant vapor rises to the top of the column and then passes through a compressor 174, where the vapor is compressed and condensed, to a holding tank 176 which is initially filled with liquid depressant. During operation of the system, depressant is returned by a pump 178 through the line 52 back to the depressant injection nozzle 44 for recycling through the system. Depressant vapor is vented from the tank 176 to the inlet mixer 54 through line 70 having a pressure relief valve 186.

Reviewing the operation of the illustrated gasoline vapor recovery system, the gasoline vapor-laden air to be processed enters the system through inlet 26. Freezing point depressant is then injected into the air and the air-depressant mixture flows through the inlet flow path 29, wherein the air is presaturated with cold gasoline in mixer 30, separated from free liquid gasoline in scrubber 56, then compressed by compressor 84, and finally introduced into the refrigerated gasoline flow path 20. The gasoline vapor in the air is then removed by condensation during flow of the air through the primary condensing zone contactor 102 and secondary condensing zone heat exchanger 126 in direct heat transfer contact with the cold liquid gasoline recirculating through the contactor and heat exchanger. The vapor free air is finally discharged to atmosphere through vent 36. The freezing point depressant is recovered in the fractionator 164 and recycled back to the stream of incoming air to be processed.

The recovery system has a line 180 through which liquid gasoline may be drawn from the holding tank 18 for storage or refilling tankers. This line contains a valve 182 controlled by a liquid level sensor 184 for the holding tank to prevent drawing of the tank below a selected minimum liquid level. Line 180 passes through the heat exchanger 148 to cool the heavy gasoline ends flowing from the fractionator 136 to the secondary condensing heat exchanger 126. As noted earlier, the present recovery system may be fabricated in separated sections which are mounted on skids or the like for fabrication in a factory and transportation to a point of use, where the sections are interconnected into a unitary system.

The inventor claims:

1. The method of recovering a vaporized volatile liquid entrained in a gas, comprising the steps of:
providing a body of liquid,
continuously recirculating liquid from said body along a closed flow path containing a refrigeration zone and a following primary condensation zone back to said body, whereby refrigerated liquid from said refrigeration zone flows through said condensation zone back to said body,
directing said gas into heat transfer relation with the recirculating liquid in said condensation zone to effect condensation of vapor from the gas, and
mixing the condensate with said gas to presaturate the gas with said condensate, then stripping free condensate liquid from the presaturated gas, and finally compressing and cooling the gas all prior to entrance of the gas into heat transfer relation with said recirculating liquid.

2. The method of recovering a vaporized volatile liquid entrained in a gas, comprising the steps of:
providing a body of said liquid,
continuously recirculating liquid from said body along a closed flow path containing a refrigeration zone and a following primary condensation zone back to said body, whereby refrigerated liquid from said refrigeration zone flows through said condensation zone back to said body,
introducing said gas into said flow path for direct contact of the gas with the liquid within said condensation zone, whereby said liquid vapor is condensed and admixed with said liquid, and
mixing liquid from said body with said gas to presaturate said gas with said liquid, then stripping free liquid from the presaturated gas, and finally compressing and cooling the gas all prior to entrance of the gas into said flow path.

3. The vapor recovery method of claim 2 wherein:
said gas is compressed within a compressor, and said method includes the additional step of recycling gas from the compressor outlet back to the compressor inlet at a rate which is regulated to maintain at least a predetermined minimum gas flow rate through the compressor.

4. The method of recovering a vaporized volatile liquid entrained in a gas, comprising the steps of:
providing a body of said liquid,
continuously recirculating liquid from said body along a closed flow path containing a refrigeration zone and a following primary condensation zone back to said body, whereby refrigerated liquid from said refrigeration zone flows through said condensation zone back to said body,
introducing said gas into said flow path for direct contact of the gas with the liquid within said condensation zone, whereby said liquid vapor is condensed and admixed with said liquid,
said gas is air and said liquid is a product such as gasoline, and
said method includes the additional steps of separating the liquid and air emerging from said condensation zone, subjecting the liquid from said condensation zone to fractionation within a fractionation zone to recover a heavy hydrocarbon fraction, passing said heavy fraction through a secondary condensation zone, introducing the emerging air from said primary condensation zone into said secondary condensation zone for direct contact with said heavy fraction whereby removing liquid vapor entrained in said air is condensed and admixed with said heavy fraction, and stripping within a scrubbing zone the free liquid from the air emerging from said secondary zone.

5. The vapor recovery method of claim 4 including the additional steps of:
venting to atmosphere the air emerging from said scrubbing zone, and recycling the liquid emerging from said scrubbing zone back to said fractionating zone.

6. The vapor recovery method of claim 5 wherein:
said fractionating step also recovers a light hydrocarbon fraction, and said method includes the further step of recycling said light fraction back to the incoming gas prior to its contact with said liquid within said primary condensation zone.

7. The vapor recovery method of claim 6 including the additional steps of:
injecting into the incoming air prior to its contact with said liquid a vaporized volatile freezing point depressant which condenses to prevent freezing of any condensed water vapor from said air,
subjecting said liquid after contact with said air to fractionation to recover said depressant and recycling the recovered depressant back to the incoming air, and
mixing liquid from said body with said air to presaturate said air with said liquid, then stripping free liquid from the presaturated air, and finally compressing and cooling the air all prior to entrance of the air into said flow path.

8. The vapor recovery method of claim 7 wherein:
said air is compressed within a compressor, and said method includes the additional step of recycling air from the compressor outlet back to the compressor inlet at a rate which is regulated to maintain at least a predetermined minimum air flow rate through the compressor.

9. The vapor recovery method of claim 8 wherein:
said liquid body has substantial volume and is thermally insulated to provide a refrigerated liquid reservoir.

10. A vapor recovery system for recovering a vaporized volatile liquid entrained in a gas comprising:
a holding tank for containing a body of said liquid,
means for continuously recirculating liquid from said body along a closed flow path containing a refrigeration zone and a following primary condensation zone back to said body, whereby refrigerated liquid from said refrigeration zone flows through said condensation zone back to said body,
means for introducing said gas into said flow path for direct contact of the gas with the liquid within said condensation zone, whereby said liquid vapor is condensed and admixed with said liquid, and
means for mixing liquid from said body with said gas to presaturate said gas with said liquid, then stripping free liquid from the presaturated gas, and finally compressing and cooling the gas all prior to entrance of the gas into said flow path.

11. The vapor recovery system according to claim 10 wherein:

said last mentioned means includes a compressor for compressing said gas, and said system includes means for recycling gas from the compressor outlet back to the compressor inlet at a rate which is regulated to maintain at least a predetermined minimum gas flow rate through the compressor.

12. A vapor recovery system for recovering a vaporized volatile liquid entrained in a gas comprising:

a holding tank for containing a body of said liquid, means for continuously recirculating liquid from said body along a closed flow path containing a refrigeration zone and a following primary condensation zone back to said body, whereby refrigerated liquid from said refrigeration zone flows through said condensation zone back to said body, means for introducing said gas into said flow path for direct contact of the gas with the liquid within said condensation zone, whereby said liquid vapor is condensed and admixed with said liquid, said gas is air and said liquid is hydrocarbon product such as gasoline, and said system includes means for separating the liquid and air emerging from said condensation zone, subjecting the liquid from said condensation zone to fractionation within a fractionation zone to recover a heavy hydrocarbon fraction, passing said heavy fraction through a secondary condensation zone, introducing the emerging air from said primary condensation zone into said secondary condensation zone for direct contact with said heavy fraction whereby removing liquid vapor entrained in said air is condensed and admixed with said heavy fraction, and stripping within a scrubbing zone the free liquid from the air emerging from said secondary zone.

13. The vapor recovery system according to claim 12 and further including:

means for venting to atmosphere the air emerging from said scrubbing zone, and recycling the liquid emerging from said scrubbing zone back to said fractionating zone.

14. The vapor recovery system according to claim 13 wherein:

said fractionating system also recovers a light hydrocarbon fraction, and said system includes means for recycling said light fraction back to the incoming gas prior to its contact with said liquid within said primary condensation zone.

15. The vapor recovery system according to claim 14 and further including:

means for injecting into the incoming air prior to its contact with said liquid a vaporized volatile freezing point depressant which condenses to prevent freezing of any condensed water vapor from said air, means for subjecting said liquid after contact with said air to fractionation to recover said depressant and recycling the recovered depressant back to the incoming air, and means for mixing liquid from said body with said air to presaturate said air with said liquid, then stripping free liquid from the presaturated air, and finally compressing and cooling the air all prior to entrance of the air into said flow path.

16. The vapor recovery system according to claim 15 wherein:

said last mentioned means includes a compressor for compressing said air, and said system includes means for recycling air from the compressor outlet back to the compressor inlet at a rate which is regulated to maintain at least a predetermined minimum air flow rate through the compressor.

17. The vapor recovery system according to claim 16 wherein:

said liquid body has substantial volume and is thermally insulated to provide a refrigerated liquid reservoir.

18. A vapor recovery system for recovering a vaporized volatile liquid entrained in a gas comprising:

a holding tank for containing a body of liquid, means for continuously recirculating liquid from said tank along a closed flow path containing a refrigeration zone and a following primary condensation zone back to said tank, whereby refrigerated liquid from said refrigeration zone flows through said condensation zone back to said tank, means for directing said gas into heat transfer relation with the recirculating liquid in said condensation zone to effect condensation of vapor from the gas, and means for mixing the condensate with said gas to presaturate the gas with said condensate, then stripping free condensate liquid from the presaturated gas, and finally compressing and cooling the gas all prior to entrance of the gas into heat transfer relation with said recirculating liquid.

* * * * *